United States Patent
Deng (10) Patent No.: US 12,501,501 B2
(45) Date of Patent: Dec. 16, 2025

(54) METHOD FOR PAIRING TWS EARPHONE, STORAGE MEDIUM, CHIP AND TWS EARPHONE

(71) Applicant: Shenzhen Bluetrum Technology Co., Ltd., Guangdong (CN)

(72) Inventor: Xiaobin Deng, Guangdong (CN)

(73) Assignee: Shenzhen Bluetrum Technology Co., Ltd., Shenzhen (CN)

( * ) Notice: Subject to any disclaimer, the term of this patent is extended or adjusted under 35 U.S.C. 154(b) by 724 days.

(21) Appl. No.: 17/955,528

(22) Filed: Sep. 28, 2022

(65) Prior Publication Data

US 2023/0217515 A1 Jul. 6, 2023

(30) Foreign Application Priority Data

Jan. 4, 2022 (CN) .......................... 202210004845.2

(51) Int. Cl.
*H04W 76/14* (2018.01)
*H04R 1/10* (2006.01)

(52) U.S. Cl.
CPC ............ *H04W 76/14* (2018.02); *H04R 1/10* (2013.01); *H04R 2420/05* (2013.01); *H04R 2420/07* (2013.01)

(58) Field of Classification Search
CPC ..... H04W 76/14; H04W 84/18; H04W 12/50; H04W 4/80; H04W 76/10; H04W 12/04; H04R 1/10; H04R 2420/05; H04R 2420/07; H04R 1/1025; H04R 1/1016; H04R 5/033; H04R 2201/10; H04B 5/00

USPC ........................................................ 455/41.1
See application file for complete search history.

(56) References Cited

U.S. PATENT DOCUMENTS

| | | | |
|---|---|---|---|
| 2019/0098675 A1 | 3/2019 | Paycher | |
| 2020/0129760 A1* | 4/2020 | Baker | H04R 1/1016 |
| 2020/0322788 A1* | 10/2020 | Batra | H04W 8/24 |
| 2021/0045191 A1 | 2/2021 | Hsieh | |
| 2021/0409856 A1 | 12/2021 | Zhu et al. | |

FOREIGN PATENT DOCUMENTS

| | | |
|---|---|---|
| CN | 108958696 A | 12/2018 |
| CN | 109618263 A | 4/2019 |
| CN | 110809243 A | 2/2020 |
| CN | 110944326 A | 3/2020 |
| CN | 110972010 A | 4/2020 |
| CN | 111107667 A | 5/2020 |
| CN | 211791968 U | 10/2020 |
| CN | 112437370 A | 3/2021 |
| JP | 2005286919 A | 10/2005 |
| JP | 2020057929 A | 4/2020 |
| KR | 20160000865 A | 1/2016 |
| KR | 20200139198 A | 12/2020 |
| KR | 20210092614 A | 7/2021 |

* cited by examiner

*Primary Examiner* — Eugene Yun (57) ABSTRACT

A method for pairing TWS earphone includes: receiving pairing information sent by second TWS earphones, determining a second time when each of the second TWS earphones enters a working state according to the pairing information, obtaining a first time of the first TWS earphone which enters the working state, controlling the pairing between the first TWS earphone and one of the second TWS earphones according to the first time, the second time and a preset duration threshold.

18 Claims, 9 Drawing Sheets

METHOD FOR PAIRING TWS EARPHONE, STORAGE MEDIUM, CHIP AND TWS EARPHONE

CROSS-REFERENCE TO RELATED APPLICATIONS

The present disclosure claims priority of Chinese Patent Application No. 202210004845.2, filed on Jan. 4, 2022, titled "Method for Pairing TWS Earphone, Storage Medium, Chip and TWS Earphone", the contents of which are incorporated herein by reference.

TECHNICAL FIELD

The present disclosure relates to the technical field of TWS earphones, and in particular, relates to a method for pairing TWS earphone, a storage medium, a chip and a TWS earphone.

BACKGROUND

TWS earphones are true wireless Bluetooth earphones which do not need connecting wires, and communication between the left earphone and the right earphone is achieved by Bluetooth. The TWS earphones may support both the mono working mode and the binaural stereo mode.

A left TWS earphone and a right TWS earphone need to be paired before using. In the related art, a method for pairing TWS earphone is provided, in which one TWS earphone broadcasts its own pairing information, and other TWS earphone performs authentication according to the pairing information. After the authentication is passed, the two TWS earphones may be paired. However, when there are many TWS equipments around the TWS earphone, the TWS earphone is likely to be serially matched or mismatched with the surrounding earphones in the broadcast state, thereby reducing the pairing efficiency.

SUMMARY

An embodiment of the present disclosure provides a method for pairing TWS earphone applied to a first TWS earphone. The method includes: receiving pairing information sent by second TWS earphones; determining a second time when each of the second TWS earphones enters a working state according to the pairing information; obtaining a first time when the first TWS earphone enters the working state; and controlling the pairing between the first TWS earphone and one of the second TWS earphones according to the first time, the second time and a preset duration threshold.

BRIEF DESCRIPTION OF THE DRAWINGS

One or more embodiments are illustrated by pictures in corresponding attached drawings, and this does not constitute limitation of the embodiments. Elements labeled with the same reference numerals in the attached drawings represent similar elements, and unless otherwise stated, figures in the attached drawings do not constitute scale limitation.

DETAILED DESCRIPTION

In order to make objects, technical solutions and advantages of the present disclosure clearer, the present disclosure will be further described in detail with reference to attached drawings and embodiments. It shall be appreciated that, the specific embodiments described herein are only used to explain the present disclosure, and are not used to limit the present disclosure. Based on the embodiments of the present disclosure, all other embodiments obtained by those of ordinary skill in the art without creative labor belong to the scope claimed in the present disclosure.

It shall be noted that, all features in the embodiments of the present disclosure may be combined with each other if there is no conflict, and all the combination are within the scope claimed in the present disclosure. In addition, although functional modules are divided in the schematic diagrams of the device and logical sequences are shown in the flowchart diagrams, in some cases, the steps shown or described may be performed in module division and sequences different from those in the schematic diagrams and flowchart diagrams. Furthermore, words such as "first", "second" and "third" used in the present disclosure do not limit the data and execution order, but only distinguish same or similar items with basically the same functions and effects.

Figure 1:
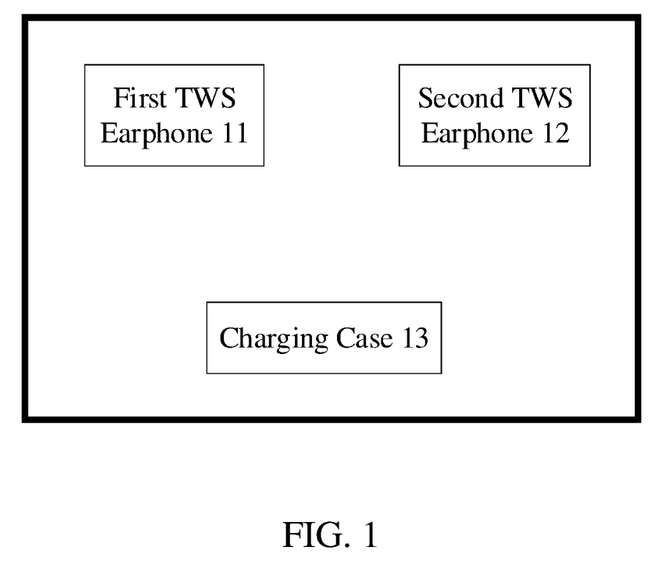
FIG. 1 is a schematic structural diagram of a TWS earphone system provided according to an embodiment of the present disclosure.

Referring to FIG. 1, a TWS earphone system 100 includes a first TWS earphone 11, a second TWS earphone 12, and a charging case 13. The charging case 13 provides two accommodating grooves for accommodating the first TWS earphone 11 and the second TWS earphone 12 respectively, and the charging case 13 may charge the first TWS earphone 11 and the second TWS earphone 12.

The first TWS earphone 11 establishes Bluetooth communication connection with the second TWS earphone 12, and the first TWS earphone 11 and the second TWS earphone 12 communicate with each other based on the Bluetooth communication connection.

In some embodiments, the first TWS earphone 11 may be a master earphone, and the second TWS earphone 12 may be a slave earphone. For example, the first TWS earphone 11 broadcasts its own pairing information, and the second TWS earphone 12 scans the pairing information of the first TWS earphone 11. If the second TWS earphone 12 successfully authenticates the pairing information of the first TWS earphone 11, the second TWS earphone 12 may be paired with the first TWS earphone 11, wherein the first TWS earphone 11 is the master earphone, and the second TWS earphone 12 is the slave earphone. In some embodiments, the master earphone and the slave earphone may also be self-defined and selected by the user between the first TWS earphone 11 and the second TWS earphone 12 according to some rules.

In some embodiments, the first TWS earphone 11 may be a slave earphone and the second TWS earphone 12 may be a master earphone. For example, the second TWS earphone 12 broadcasts its own pairing information, and the first TWS earphone 11 scans the pairing information of the second TWS earphone 12. If the first TWS earphone 11 successfully authenticates the pairing information of the second TWS earphone 12, the first TWS earphone 11 may be paired with the second TWS earphone 12, wherein the first TWS earphone 11 is the slave earphone and the second TWS earphone 12 is the master earphone.

In some embodiments, when the first TWS earphone 11 or the second TWS earphone 12 is placed in the charging case 13 for charging, the user takes out the first TWS earphone 11 or the second TWS earphone 12 from the charging case 13, and then the first TWS earphone 11 or the second TWS earphone 12 starts to enter the working state. For example, the first TWS earphone 11 or the second TWS earphone 12 starts to be initialized, and performs a back-connecting operation or a pairing operation. The back-connecting operation means that after two TWS earphones have been successfully paired previously, when one TWS earphone enters the working state, this TWS earphone starts to search for the pairing information of the other TWS earphone to which it is paired previously. If the pairing information of the other TWS earphone is found, the two TWS earphones are paired, and this process may be regarded as the back-connecting operation. If no pairing information of the other TWS earphone is found, then the TWS earphone will search for suitable TWS earphones for pairing. Therefore, when the TWS earphone is taken out of the charging case, the TWS earphone will automatically enter the working state.

Some embodiments differ from the above embodiments in that: when the TWS earphone is taken out of the charging case, the TWS earphone may not enter the working state immediately, and the TWS earphone needs to be further operated by the user before the TWS earphone may enter the working state. For example, if the first TWS earphone 11 or the second TWS earphone 12 is placed in the charging case 13 for charging, then after the user takes out the first TWS earphone 11 or the second TWS earphone 12 from the charging case 13, the user needs to further touch the start button on the first TWS earphone 11 or the second TWS earphone 12 before the first TWS earphone 11 or the second TWS earphone 12 may enter the working state.

When the first TWS earphone 11 or the second TWS earphone 12 enters the working state, each of the first TWS earphone 11 or the second TWS earphone 12 needs to record the current local time, so as to execute the TWS earphone pairing method described in each of the following embodiments subsequently.

It shall be appreciated that, the first TWS earphone may be a left earphone, the second TWS earphone may be a right earphone, or the first TWS earphone may be a right earphone, and the second TWS earphone may be a left earphone. Neither the master-slave type nor the left-right type of the first TWS earphone and the second TWS earphone is limited herein.

Figure 2:
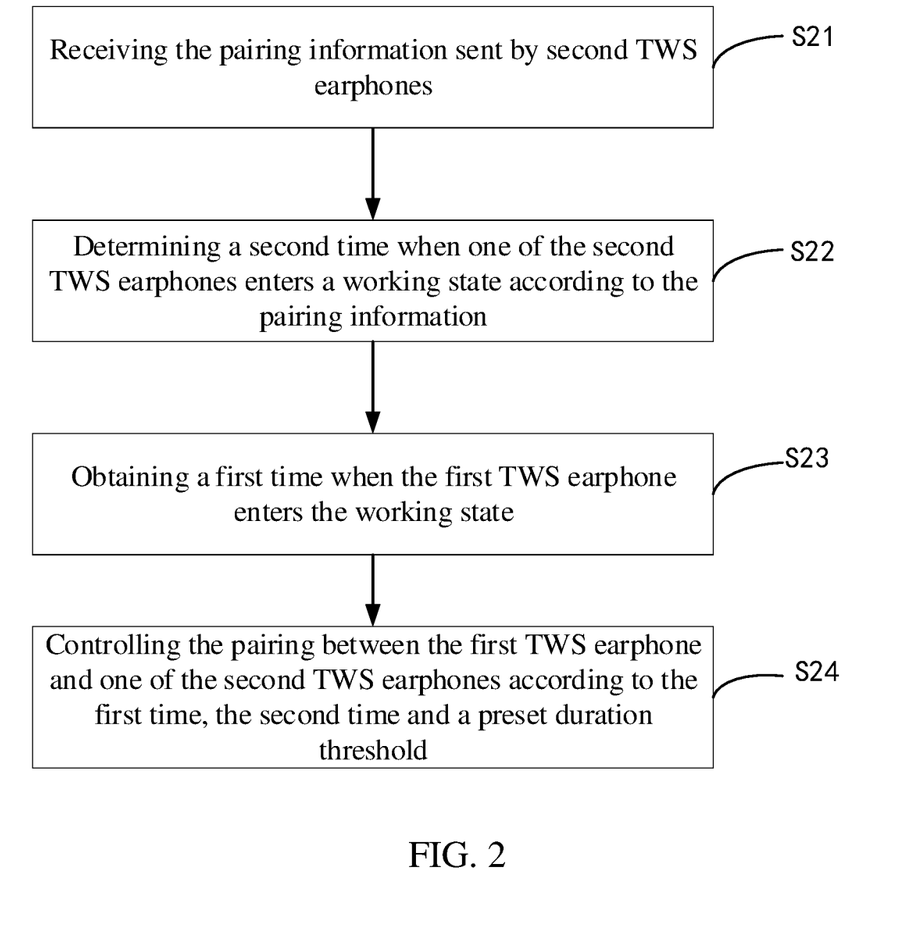
FIG. 2 is a schematic flowchart diagram of a method for pairing TWS earphone provided according to an embodiment of the present disclosure.

An embodiment of the present disclosure provides a method for pairing TWS earphone, which is applied to the first TWS earphone. Referring to FIG. 2, the method for pairing TWS earphone includes:

S21: receiving the pairing information sent by second TWS earphones.

In this step, the pairing information is the information regarding the pairing between the second TWS earphones and the first TWS earphone, wherein the pairing information may adopt a data format satisfying the TWS protocol. For example, the pairing information includes an access code, a header and a payload, wherein the access code is associated with the Bluetooth address of the second TWS earphone, the header is used for transmission control, and the payload carries the data content to be sent. It shall be appreciated that, the data content within the payload may be self-defined by the user according to the design requirements.

S22: determining a second time when each of the second TWS earphone enters a working state according to the pairing information.

In this step, the second time is the time when each of the second TWS earphones enters the working state. For example, after the second TWS earphone is taken out of the charging case, the second TWS earphone automatically enters the working state, so the second TWS earphone starts to record the current local time and takes the current local time as the second time. For another example, after the second TWS earphone is taken out of the charging case, the second TWS earphone enters the working state after the user touches the second TWS earphone to start it, then the second TWS earphone starts to record the current local time, and takes the current local time as the second time.

In some embodiments, the second TWS earphone may encapsulate the second time into the payload, and the second time is received by the first TWS earphone along with the pairing information of the second TWS earphone.

In some embodiments, the second TWS earphone stores the second time locally.

In some embodiments, the pairing information carries a time stamp, and the first TWS earphone extracts the time stamp according to the pairing information, wherein the time stamp is the signature data encapsulated with the second time. The first TWS earphone analyzes the pairing information and extracts the time stamp from the pairing information. Then, the first TWS earphone extracts the second time when the second TWS earphone enters the working state according to the time stamp.

S23: obtaining a first time when the first TWS earphone enters the working state.

In this step, the first time is the time when the first TWS earphone enters the working state. For example, after the first TWS earphone is taken out of the charging case, the first TWS earphone automatically enters the working state, so the first TWS earphone starts to record the current local time and takes the current local time as the first time. For another example, after the first TWS earphone is taken out of the charging case, the first TWS earphone enters the working state after the user touches the first TWS earphone to start it, then the first TWS earphone starts to record the current local time, and takes the current local time as the first time.

In this step, the first TWS earphone stores the first time locally.

S24: controlling the pairing between the first TWS earphone and one of the second TWS earphones according to the first time, the second time and a preset duration threshold.

In this step, the preset duration threshold may be self-defined by the user according to the engineering experience, and for example, the preset duration threshold is 10 seconds or 30 seconds or 60 seconds or 5 minutes or the like.

The present disclosure may effectively and reliably control the pairing between the first TWS earphone and the second TWS earphone automatically to avoid the phenomenon of serial matching or mismatch as much as possible, and the pairing operation is simple, which is beneficial for improving the pairing efficiency of the TWS earphones.

Figure 3:
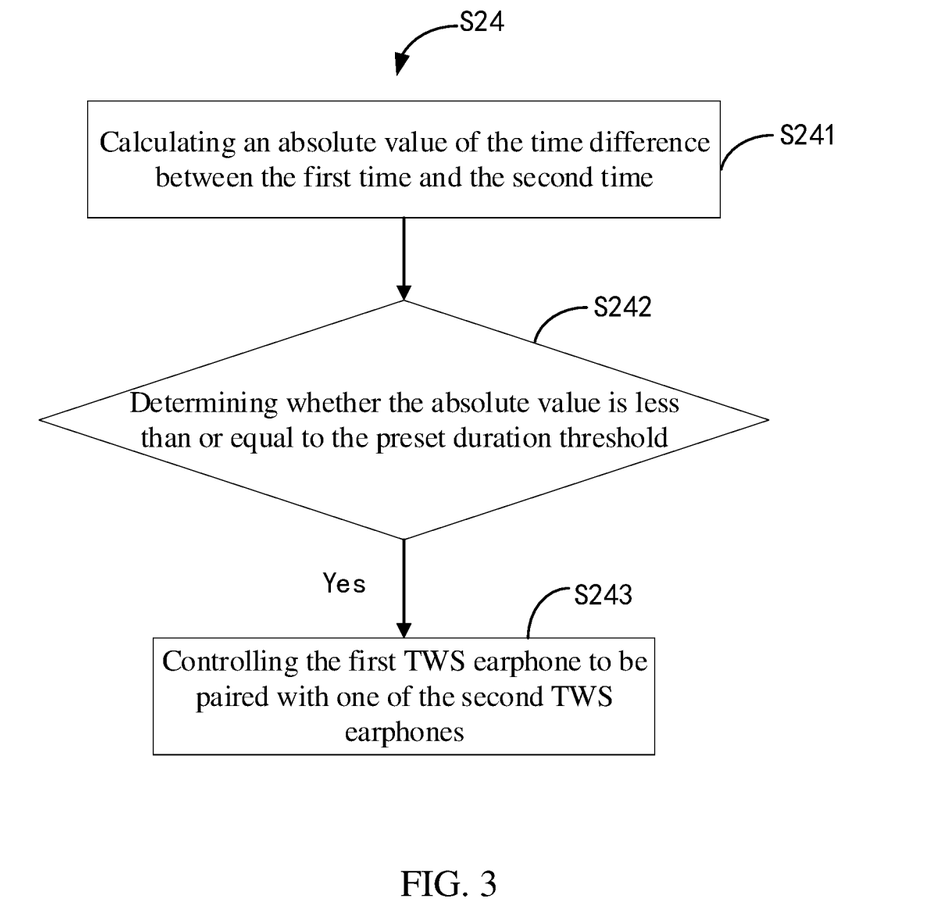
FIG. 3 is a first schematic flowchart diagram of S24 shown in FIG. 2.

In some embodiments, referring to FIG. 3, S24 includes:

S241: calculating an absolute value of the time difference between the first time and the second time;

S242: determining whether the absolute value is less than or equal to the preset duration threshold;

S243: controlling the first TWS earphone to be paired with one of the second TWS earphones if the absolute value is less than or equal to the preset duration threshold.

In step S241, the first TWS earphone calculates the absolute value of the time difference between the first time and the second time according to the following equation:

|T1−T2|=ΔT, wherein T1 is the first time, T2 is the second time, and ΔT is the absolute value of the time difference between the first time and the second time.

In step S242, the first TWS earphone determines whether the absolute value is less than or equal to the preset duration threshold according to the following equation: determining whether ΔT≤Ts, wherein Ts is the preset duration threshold.

In step S243, if ΔT≤Ts, then the first TWS earphone is paired with the second TWS earphone. Generally, on the premise that the TWS earphones automatically enter the working state after they are taken out of the charging case, when the user needs to use the first TWS earphone and the second TWS earphone at the same time, the interval between the first taking-out operation of taking out the first TWS earphone and the second taking-out operation of taking out the second TWS earphone is short enough to distinguish other TWS earphones.

Figure 4:
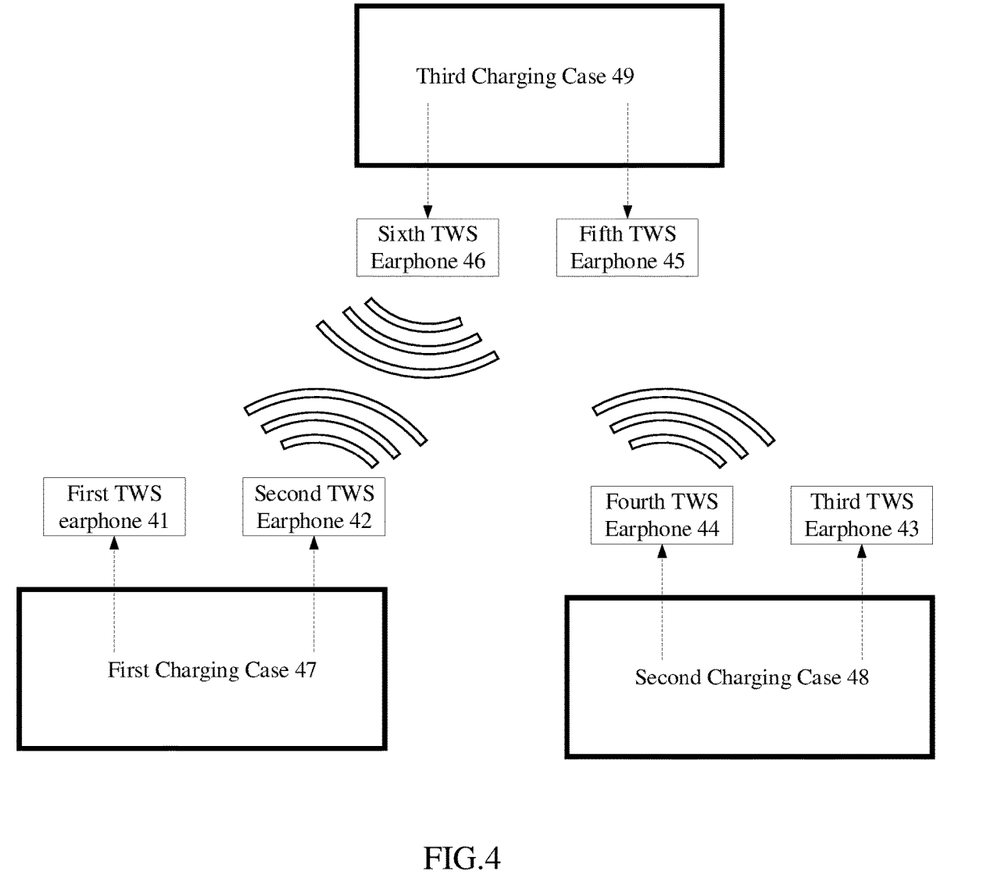
FIG. 4 is a schematic view illustrating the scene of a TWS earphone group provided according to an embodiment of the present disclosure.

For example, referring to FIG. 4, it is assumed that there are also third and fourth TWS earphones 43 and 44, and fifth and sixth TWS earphones 45 and 46 around the first and second TWS earphones 41 and 42, wherein the first and second TWS earphones 41 and 42 may be placed in the first charging case 47, the third and fourth TWS earphones 43 and 44 may be placed in the second charging case 48, and the fifth and sixth TWS earphones 45 and 46 may be placed in the third charging case 49.

It is assumed that the preset duration threshold is 30 seconds.

A user A takes out the second TWS earphone 42 from the first charging case 47 at time t1, and takes out the first TWS earphone 41 from the first charging case 47 at time t2, wherein the second TWS earphone 42 broadcasts the pairing information and the first TWS earphone 41 monitors the pairing information, wherein t2−t1=15 seconds.

A user B takes out the fourth TWS earphone 44 from the second charging case 48 at time t3, and takes out the third TWS earphone 43 from the second charging case 48 at time t4, wherein the fourth TWS earphone 44 broadcasts the pairing information and the third TWS earphone 43 monitors the pairing information, wherein t1<t3<t2, t4>t2, and t4−t3=28 seconds, t3−t1=33 seconds.

A user C takes out the sixth TWS earphone 46 from the third charging case 49 at time t5, and takes out the fifth TWS earphone 45 from the third charging case 49 at time t6, wherein the sixth TWS earphone 46 broadcasts the pairing information and the fifth TWS earphone 45 monitors the pairing information, wherein t4<t5<t6, and t6−t5=20 seconds, t5−t1=48 seconds.

As can be known from the above description, the time at which different users take out the TWS earphones from the charging cases is usually different, and the absolute value of the time difference between two TWS earphones from different charging cases is also relatively large. Therefore, by comparing the absolute value with the preset duration threshold, the TWS earphones that may be paired may be effectively and reliably determined. As mentioned above, for the first TWS earphone 41, t2−t1=15 seconds, which is less than the preset duration threshold of 30 seconds. t3−t1=33 seconds, which is greater than the preset duration threshold of 30 seconds. t5−t1=48 seconds, which is greater than the preset duration threshold of 30 seconds.

Therefore, for the first TWS earphone 41, the first TWS earphone 41 will be paired with the second TWS earphone 42 instead of being paired with the fourth TWS earphone 44 or the sixth TWS earphone 46. With this method, this embodiment is beneficial for improving the pairing reliability and the pairing efficiency, thereby improving the user experience.

Figure 5:
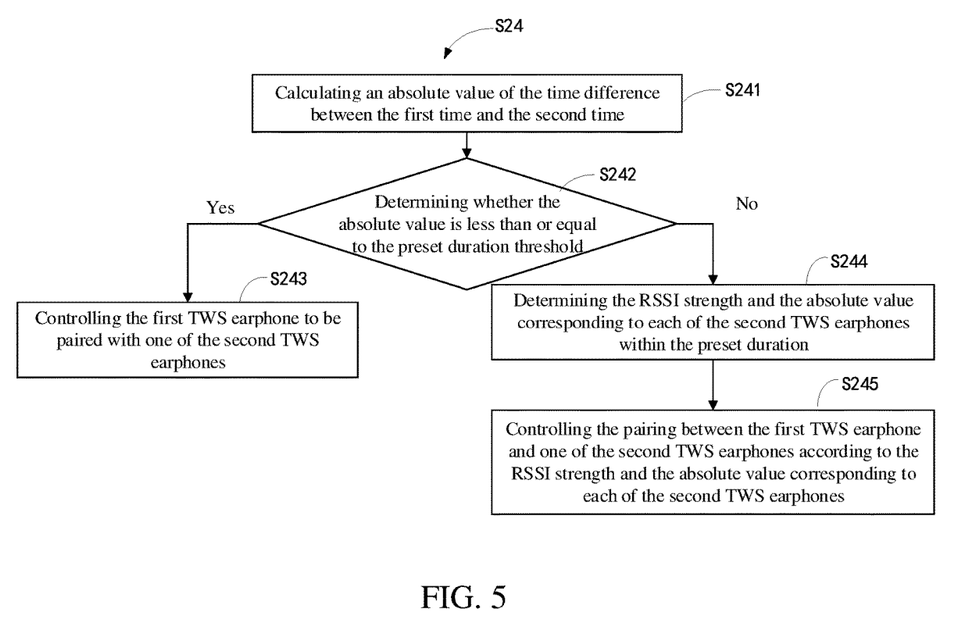
FIG. 5 is a second schematic flowchart diagram of S24 shown in FIG. 2.

In some embodiments, when there are a plurality of second TWS earphones around the first TWS earphone, in order to accurately and reliably search out the second TWS earphone that may be paired among the plurality of second TWS earphones, referring to FIG. 5, S24 further includes:

S244: determining a RSSI strength and the absolute value corresponding to each of the second TWS earphones within the preset duration, if the absolute value is greater than the preset duration threshold;

S245: controlling the pairing between the first TWS earphone and one of the second TWS earphones according to the RSSI strength and the absolute value corresponding to each second TWS earphone.

In step S244, when the second TWS earphone broadcasts the pairing information, the first TWS earphone receives the pairing information, and may further detect the RSSI strength of the second TWS earphone. When there are a plurality of second TWS earphones around the first TWS earphone, and the pairing information broadcasted by each second TWS earphone may be received by the first TWS earphone, the first TWS earphone may detect the RSSI strength of each second TWS earphone and the absolute value corresponding to each second TWS earphone. Therefore, the first TWS earphone may collect the RSSI strength and the absolute value of all the second TWS earphones in a preset duration, so as to reliably select the second TWS earphone that may be paired subsequently.

In step S245, the first TWS earphone may control the pairing between the first TWS earphone and the second TWS earphone in combination with any suitable algorithm and according to the RSSI strength and the absolute value corresponding to each second TWS earphone.

In some embodiments, step S245 includes: determining whether the RSSI strength corresponding to each of the second TWS earphones is greater than the preset strength threshold; if yes, selecting each of the second TWS earphones corresponding to the RSSI strengths greater than the preset strength threshold as a candidate TWS earphone, and selecting one of candidate TWS earphones corresponding to the largest absolute value as a target TWS earphone, and controlling the first TWS earphone to be paired with the target TWS earphone; and if no, continuing to search for the pairing information.

For example, there are second TWS earphones B1, B2, B3, B4, B5 and B6 around the first TWS earphone. Since the RSSI strengths of the second TWS earphones B1, B3 and B5 are all lower than the preset strength threshold, the first TWS earphone discards the second TWS earphones B1, B3 and B5, and selects the second TWS earphones B2, B4 and B6 as candidate TWS earphones.

Among the second TWS earphones B2, B4 and B6, since the absolute value of the second TWS earphone B4 is the largest, the first TWS earphone selects the second TWS earphones B4 as the target TWS earphone, and the first TWS earphone is paired with the second TWS earphone B4. With this method, the first TWS earphone may relatively reliably screen out the second TWS earphone that may be paired.

Figure 6:
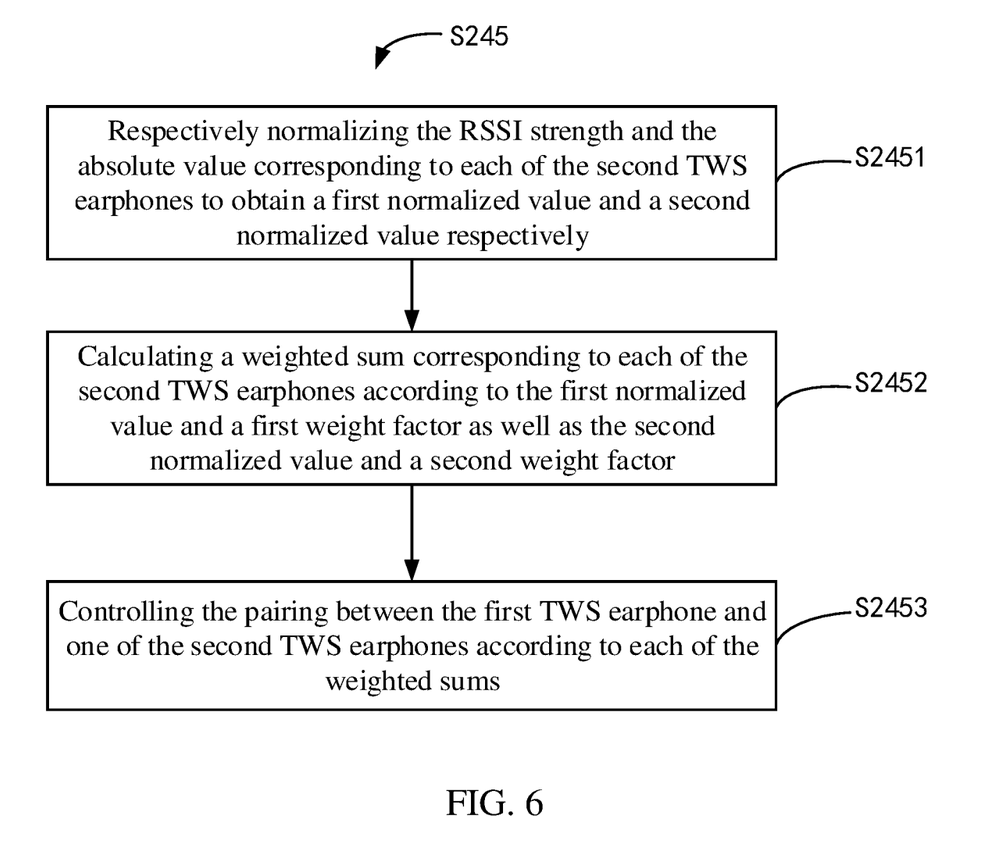
FIG. 6 is a schematic flowchart diagram of S245 shown in FIG. 5.

Some embodiments differ from the above embodiments in that: referring to FIG. 6, step S245 includes:

S2451: respectively normalizing the RSSI strength and the absolute value corresponding to each of the second TWS earphones to obtain a first normalized value and a second normalized value respectively;

S2452: calculating a weighted sum corresponding to each of the second TWS earphones according to the first normalized value and a first weight factor as well as the second normalized value and a second weight factor;

S2453: controlling the pairing between the first TWS earphone and one of the second TWS earphones according to each weighted sum.

In step S2451, in combination with the above examples, there are second TWS earphones B1, B2, B3, B4, B5 and B6 around the first TWS earphone.

The second TWS earphone B1 has an RSSI strength of r1, and an absolute value of d1. The second TWS earphone B2 has an RSSI strength of r2, and an absolute value of d2. The second TWS earphone B3 has an RSSI strength of r3, and an absolute value of d3. The second TWS earphone B4 has an RSSI strength of r4, and an absolute value of d4. The second TWS earphone B5 has an RSSI strength of r5, and an absolute value of d5. The second TWS earphone B6 has an RSSI strength of r6, and an absolute value of d6.

The first TWS earphone normalizes the RSSI strength and the absolute value corresponding to each second TWS earphone according to the following equations as follows:

$$\eta_i = \tan h(r_i) \quad \text{Equation 1}$$

$$\zeta_i = \tan h(d_i) \quad \text{Equation 2}$$

$$\psi_i = \alpha^* \eta_i + \beta^* \zeta_i \quad \text{Equation 3}$$

$$1 = \alpha + \beta \quad \text{Equation 4}$$

wherein $\eta_i$ is the first normalized value corresponding to the second TWS earphone Bi, $\zeta_i$ is the second normalized value corresponding to the second TWS earphone Bi, $r_i$ is the RSSI strength corresponding to the second TWS earphone Bi, $d_i$ is the absolute value corresponding to the second TWS earphone Bi, $\alpha$ is the first weight factor, $\beta$ is the second weight factor, and $\omega_i$ is the weighted sum corresponding to the second TWS earphone Bi.

In step S2451, the first TWS earphone calculates the first normalized value corresponding to each of the second TWS earphones according to Equation 1. The first TWS earphone calculates the second normalized value corresponding to each of the second TWS earphones according to Equation 2.

In step S2452, the first TWS earphone calculates the weighted sum corresponding to each second TWS earphone according to Equation 3 and Equation 4.

In step S2453, the first TWS earphone may control the pairing between the first TWS earphone and the second TWS earphone in combination with any suitable algorithm and according to each weighted sum.

Figure 7:
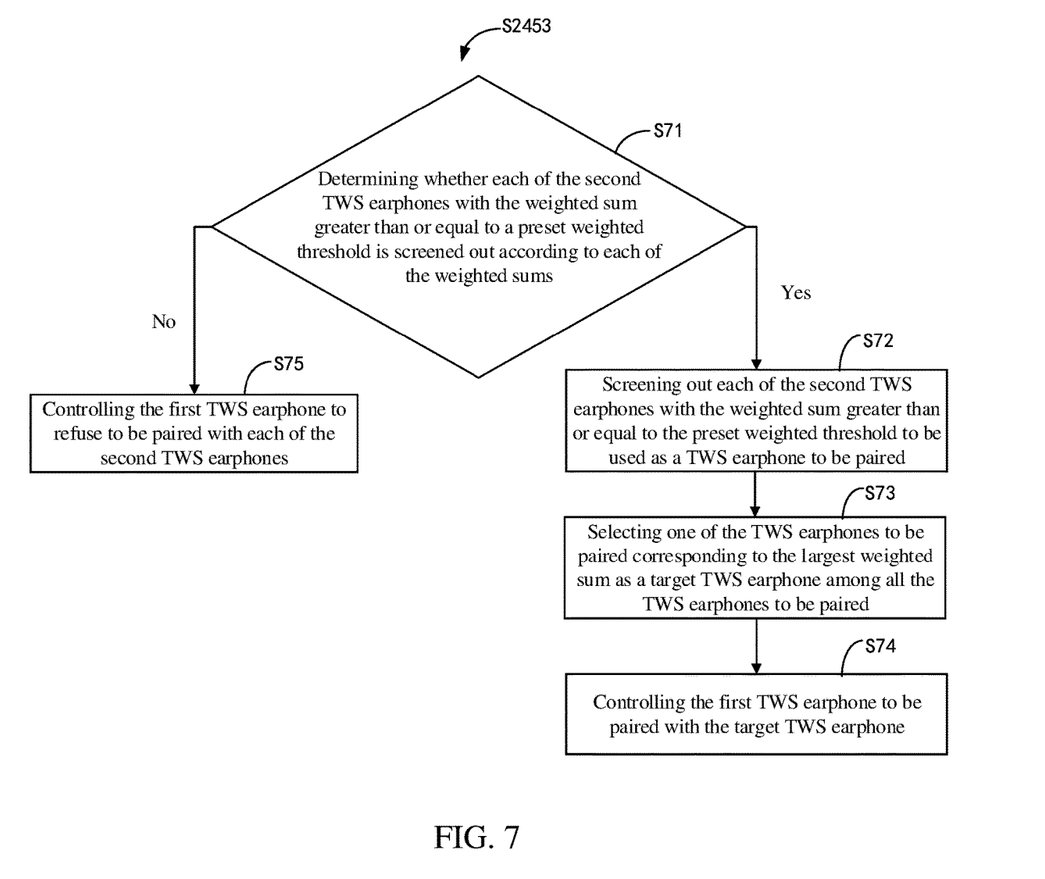
FIG. 7 is a schematic flowchart diagram of S2453 shown in FIG. 6.

In some embodiments, referring to FIG. 7, S2453 includes:

S71: determining whether each of the second TWS earphones with the weighted sum greater than or equal to a preset weighted threshold is screened out according to each of the weighted sums; if yes, executing S72; and if no, executing S75.

S72: if yes, screening out each of the second TWS earphones with the weighted sum greater than or equal to the preset weighted threshold to be used as a TWS earphone to be paired, and executing S73;

S73: selecting one of the TWS earphones to be paired corresponding to the largest weighted sum as a target TWS earphone among all the TWS earphones to be paired, and executing S74;

S74: controlling the first TWS earphone to be paired with the target TWS earphone;

S75: if no, controlling the first TWS earphone to refuse to be paired with each second TWS earphone.

In combination with the above examples, there are second TWS earphones B1, B2, B3, B4, B5 and B6 around the first TWS earphone.

The weighted sum of the second TWS earphone B1 is $\psi 1$, the weighted sum of the second TWS earphone B2 is $\psi 2$, the weighted sum of the second TWS earphone B3 is $\psi 3$, the weighted sum of the second TWS earphone B4 is $\psi 4$, the weighted sum of the second TWS earphone B5 is $\psi 5$ and the weighted sum of the second TWS earphone B6 is $\psi 6$.

Since the weighted sums $\psi 1$, $\psi 3$ and $\psi 6$ are smaller than the preset weighted threshold, and the weighted sums $\psi 2$, $\psi 4$ and $\psi 5$ are larger than the preset weighted threshold, the first TWS earphone takes the second TWS earphones B2, B4 and B5 as the TWS earphone to be paired.

Among the weighted sums $\psi 2$, $\psi 4$ and $\psi 5$, since the weighted sum $\psi 4$ is the largest, the first TWS earphone selects the second TWS earphone B4 as the target TWS earphone, and the first TWS earphone is paired with the second TWS earphone B4.

In this embodiment, both the RSSI strength and the absolute value of the time difference are taken into consideration and comprehensively evaluated, so it is favorable for the first TWS earphone to more reliably and accurately search out the second TWS earphone that may be paired.

It shall be appreciated that, the first weight factor, the second weight factor and the preset weighted threshold may be self-defined by users according to engineering experience.

Figure 8:
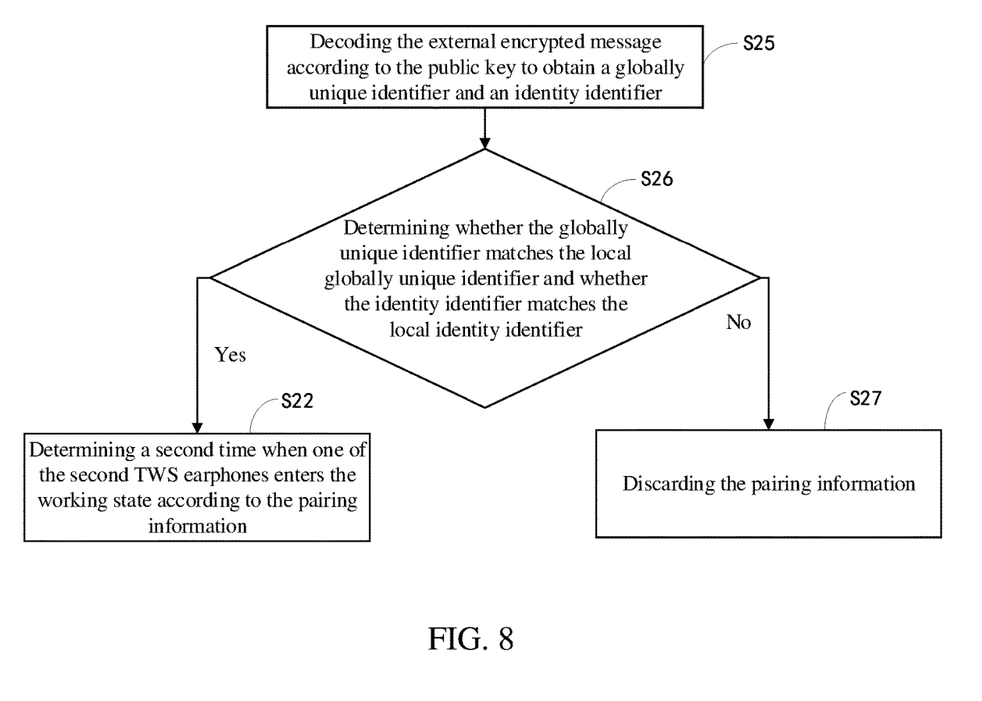
FIG. 8 is a schematic flowchart diagram of a method for pairing TWS earphone provided according to another embodiment of the present disclosure.

In some embodiments, the pairing information includes an external encrypted message and a public key. Before the operation of determining a second time when the second TWS earphone enters the working state according to the pairing information, referring to FIG. 8, the method for pairing TWS earphone further includes:

S25: decoding the external encrypted message according to the public key to obtain a globally unique identifier and an identity identifier;

S26: determining whether the globally unique identifier matches the local globally unique identifier and whether the identity identifier matches the local identity identifier; if yes, entering step S22; and if no, executing S27.

S27: discarding the pairing information.

For example, in this embodiment, the globally unique identifier and the identity identifier are written on the payload. Because each kind of products has a specific globally unique identifier, the globally unique identifier of the same kind of products is the same, and the identity identifier is the unique identifier assigned by Bluetooth Association to each manufacturer. In some embodiments, the globally unique identifier and the identity identifier may form a 16-byte character string, and this embodiment may use the public key to encrypt the character string described above according to the AES encryption algorithm to generate an external encrypted message. In some embodiments, the public key is a known pseudo-random number of 2 bytes.

When the first TWS earphone receives the pairing information, it extracts the external encrypted message from the pairing information, and then decodes the external encrypted message with the known public key, so that the globally unique identifier and the identity identifier may be obtained. Then, the first TWS earphone matches the globally unique identifier with the local globally unique identifier, and matches the identity identifier with the local identity identifier. If both of the matching operations are successful at the same time, it means that the second TWS earphone belongs to the TWS earphone produced by this company, so that the TWS earphones produced by an external manufacturer may be filtered out. In this way, the pairing reliability and the pairing efficiency of the first TWS earphone and the second TWS earphone may be further enhanced, and camouflage pairing and malicious attacks from other equipments may be prevented, thereby improving the pairing security.

Figure 9:
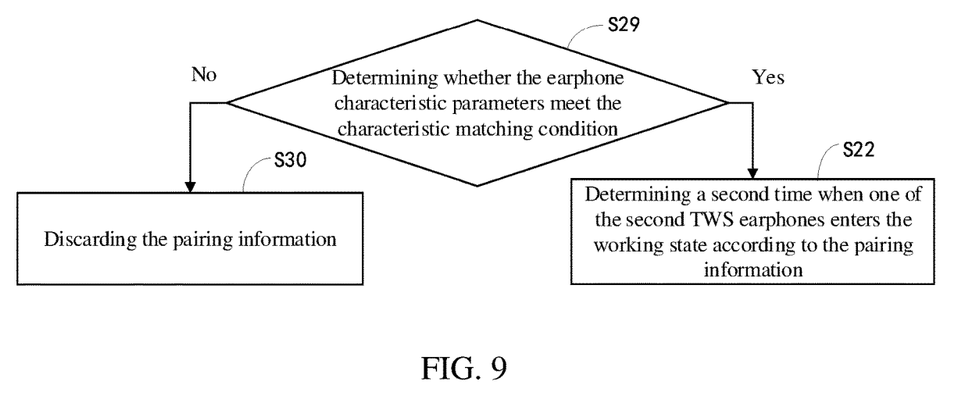
FIG. 9 is a schematic flowchart diagram of a method for pairing TWS earphone provided according to yet another embodiment of the present disclosure.

In some embodiments, the pairing information further includes earphone characteristic parameters. Before the operation of determining a second time when the second TWS earphone enters the working state according to the pairing information, referring to FIG. 9, the method for pairing TWS earphone further includes:

S29: determining whether the earphone characteristic parameters meet the characteristic matching condition; if yes, entering step S22; and if no, executing S30;

S30: discarding the pairing information.

The earphone characteristic parameters include sound channel characteristic parameters, functional characteristic parameters or the like. The characteristic matching condition may be self-defined by users according to product characteristics. For example, the characteristic matching condition includes that the sound channel characteristic parameters of two TWS earphones are different or the functional characteristic parameters of two TWS earphones are the same. If the sound channel characteristic parameters of two TWS earphones are different or the functional characteristic parameters of two TWS earphones are the same, then the first TWS earphone and the second TWS earphone meet the characteristic matching condition, and otherwise, the first TWS earphone and the second TWS earphone do not meet the characteristic matching condition.

In some embodiments, the field of the earphone characteristic parameters consists of a 1-byte role characteristic field and a 2-byte function characteristic field.

The role characteristic field is mainly used to indicate the following situations: 1. whether the tws function is supported; 2. master-slave roles; 3. whether there is a matching record; 4. whether to perform compulsory pairing; 5. left and right sound channel information, for example, if two TWS earphones are both left sound channels, then they may not be paired.

The function characteristic field is mainly used to indicate the following situations: 1. whether AAC is supported; 2. whether broadband voice is supported; 3. whether synchronous ringing of incoming calls is supported, for example, if one TWS earphone supports broadband voice and the other TWS does not support broadband voice, then they may not be paired.

With the above method, the internal TWS equipments may be further filtered out, and the pairing reliability and the pairing efficiency of the first TWS earphone and the second TWS earphone may be further enhanced.

It shall be noted that, in each of the above embodiments, the above steps are not necessarily executed in a certain order. According to the description of the embodiments of the present disclosure, those of ordinary skill in the art may understand that in different embodiments, the above steps may be executed in different orders. That is, these steps may be executed in parallel or the steps may be exchanged for execution, and so on.

Figure 10:
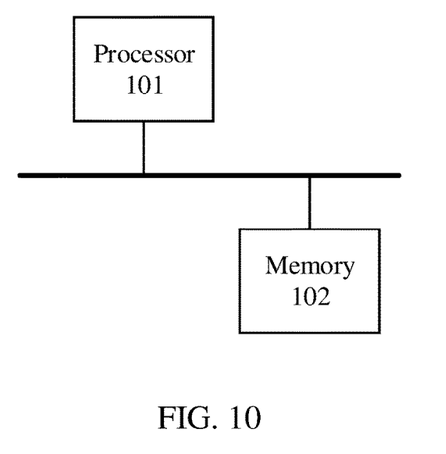
FIG. 10 is a schematic view of a circuit structure of an electronic equipment provided according to an embodiment of the present disclosure.

Referring to FIG. 10, which is a schematic diagram of a circuit structure of an electronic equipment provided according to an embodiment of the present disclosure, the electronic equipment may be a chip or a TWS earphone, and when the electronic equipment is a TWS earphone, it may be used as the first TWS earphone or the second TWS earphone. As shown in FIG. 10, the electronic equipment includes one or more processors 101 and a memory 102. In FIG. 10, one processor 101 is taken as an example.

The processor 101 and the memory 102 may be connected by a bus or other means, and the connection achieved by a bus is taken as an example in FIG. 10.

As a nonvolatile computer readable storage medium, the memory 102 may be used to store nonvolatile software programs, nonvolatile computer executable programs and modules, such as program instructions/modules corresponding to the TWS earphone pairing method in the embodiment of the present disclosure. The processor 101 achieves the functions of the TWS earphone pairing method provided according to the above embodiments of the method by running nonvolatile software programs, instructions and modules stored in the memory 102.

The memory 102 may include a high-speed random access memory, and may also include a nonvolatile memory, such as at least one magnetic disk memory device, flash memory device, or other nonvolatile solid-state memory device. In some embodiments, the memory 102 optionally includes memories remotely located relative to the processor 101, and these remote memories may be connected to the processor 101 through a network. Examples of the above network include but are not limited to the Internet, Intranet, local area networks, mobile communication networks and combinations thereof.

The program instructions/modules are stored in the memory 102, and execute the TWS earphone pairing method in any of the above embodiments of the method when they are executed by the one or more processors 101.

An embodiment of the present disclosure further provides a storage medium, in which computer executable instructions are stored. The computer executable instructions, when executed by one or more processors, e.g., a processor 101 in FIG. 10, may cause the one or more processors to execute the TWS earphone pairing method in any of the above embodiments of the method.

An embodiment of the present disclosure further provides a computer program product, which includes a computer program stored on a nonvolatile computer readable storage medium, and the computer program includes program instructions. The program instructions, when executed by an electronic equipment, cause the electronic equipment to execute any of the TWS earphone pairing methods.

The embodiments of the above-described devices or equipments are only schematic. The unit modules described as separate components may or may not be physically separated, and components displayed as module units may or may not be physical units, that is, they may be located in one place or distributed over multiple network module units. Some or all of the modules may be selected according to actual needs to achieve the purpose of this embodiment.

From the description of the above embodiments, those skilled in the art may clearly understand that each embodiment may be realized by means of software plus a general hardware platform, and of course, it may also be realized by hardware. Based on such understanding, the essence of the above technical solution or the part that contributes to related technologies may be embodied in the form of software products. The computer software products may be stored in computer-readable storage media, such as a ROM/RAM, a magnetic disk, an optical disk or the like, and they include several instructions to make a computer equipment (which may be a personal computer, a server, or a network equipment, etc.) execute the method described in various embodiments or some parts of embodiments.

Finally, it shall be noted that, the above embodiments are only used to illustrate the technical solution of the present disclosure, but not to limit the present disclosure. Under the concept of the present disclosure, technical features in the above embodiments or different embodiments may also be combined, the steps may be realized in any order, and many other variations in different aspects of the present disclosure as described above are possible, and these variations are not provided in details for conciseness. Although the present disclosure has been described in detail with reference to the foregoing embodiments, those of ordinary skill in the art shall appreciate that, the technical solutions described in the foregoing embodiments may still be modified or some of the technical features may be equivalently replaced. These modifications or substitutions do not make the essence of the corresponding technical solutions deviate from the scope of the technical solutions of various embodiment of the present disclosure.

What is claimed is:

1. A method for pairing TWS earphone applied to a first TWS earphone, comprising:
   receiving pairing information sent by second TWS earphones;
   determining a second time when each of the second TWS earphones enters a working state according to the pairing information;
   obtaining a first time when the first TWS earphone enters the working state;
   calculating an absolute value of the time difference between the first time and the second time;
   determining whether the absolute value is less than or equal to a preset duration threshold; and
   controlling the first TWS earphone to be paired with one of the second TWS earphones if the absolute value is less than or equal to the preset duration threshold.

2. The method of claim 1, further comprising: recording a current local time as the first time when the first TWS earphone is detected to enter the working state.

3. The method of claim 1, wherein the first TWS earphone automatically enters the working state after the first TWS earphone is taken out of a charging case.

4. The method of claim 1, wherein the first TWS earphone responds to startup operation and enters the working state after the first TWS earphone is taken out of a charging case.

5. The method of claim 1, wherein each of the second TWS earphones takes a current local time as the second time when each of the second TWS earphones enters the working state.

6. The method of claim 1, wherein the pairing information comprises a payload, each of the second TWS earphones encapsulates the second time into the payload.

7. The method of claim 1, wherein each of the second TWS earphones automatically enters the working state after each of the second TWS earphones is taken out of a charging case.

8. The method of claim 1, wherein each of the second TWS earphones responds to startup operation and enters the working state after each of the second TWS earphones is taken out of a charging case.

9. The method of claim 1, wherein the controlling the first TWS earphone to be paired with one of the second TWS earphones if the absolute value is less than or equal to the preset duration threshold comprises:
   determining a RSSI strength and the absolute value corresponding to each of the second TWS earphones within a preset duration, if the absolute value is greater than the preset duration threshold; and
   controlling the pairing between the first TWS earphone and one of the second TWS earphones according to the RSSI strength and the absolute value corresponding to each of the second TWS earphones.

10. The method of claim 9, wherein the controlling the pairing between the first TWS earphone and one of the second TWS earphones according to the RSSI strength and the absolute value corresponding to each of the second TWS earphones comprises:
    respectively normalizing the RSSI strength and the absolute value corresponding to each of the second TWS earphones to obtain a first normalized value and a second normalized value respectively;
    calculating a weighted sum corresponding to each of the second TWS earphones according to the first normalized value and a first weight factor as well as the second normalized value and a second weight factor; and
    controlling the pairing between the first TWS earphone and one of the second TWS earphones according to each of the weighted sums.

11. The method of claim 10, wherein a sum of the first weight factor and the second weight factor is natural number 1.

12. The method of claim 10, wherein the controlling the pairing between the first TWS earphone and one of the second TWS earphones according to each of the weighted sums comprises:
    determining whether each of the second TWS earphones with the weighted sum greater than or equal to a preset weighted threshold is screened out according to each of the weighted sums;
    if yes, screening out each of the second TWS earphones with the weighted sum greater than or equal to the preset weighted threshold to be used as a TWS earphone to be paired, and selecting one of the TWS earphones to be paired corresponding to the largest weighted sum as a target TWS earphone among all the TWS earphones to be paired, and controlling the first TWS earphone to be paired with the target TWS earphone;
    if no, controlling the first TWS earphone to refuse to be paired with each of the second TWS earphones.

13. The method of claim 9, wherein the controlling the pairing between the first TWS earphone and one of the second TWS earphones according to the RSSI strength and the absolute value corresponding to each of the second TWS earphones comprises:

determining whether the RSSI strength corresponding to each of the second TWS earphones is greater than the preset strength threshold;

if yes, selecting each of the second TWS earphones corresponding to the RSSI strengths greater than the preset strength threshold as a candidate TWS earphone, and selecting one of candidate TWS earphones corresponding to the largest absolute value as a target TWS earphone, and controlling the first TWS earphone to be paired with the target TWS earphone;

if no, continuing to search for the pairing information.

14. The method of claim 1, wherein the pairing information comprises an external encrypted message and a public key, and before the operation of determining a second time when each of the second TWS earphones enters the working state according to the pairing information, the method further comprises:

decoding the external encrypted message according to the public key to obtain a globally unique identifier and an identity identifier;

determining whether the globally unique identifier matches the local globally unique identifier and whether the identity identifier matches the local identity identifier;

if yes, entering the step of determining a second time when each of the second TWS earphones enters the working state according to the pairing information;

if no, discarding the pairing information.

15. The method of claim 14, wherein the pairing information further comprises earphone characteristic parameters, and before the operation of determining a second time when each of the second TWS earphones enters the working state according to the pairing information, the method further comprises:

determining whether the earphone characteristic parameters meet the characteristic matching condition;

if yes, entering the step of determining a second time when each of the second TWS earphones enters the working state according to the pairing information;

if no, discarding the pairing information.

16. The method of claim 15, wherein the public key is a known pseudo-random number of 2 bytes.

17. A chip, comprising:

at least one processor; and a memory communicatively connected with the at least one processor; wherein the memory stores instructions executable by the at least one processor, the instructions, when executed by the at least one processor, enable the at least one processor to execute the method for pairing TWS earphone of claim 1.

18. A method for pairing TWS earphone applied to a second TWS earphone, comprising:

determining a second time when the second TWS earphone enters a working state;

encapsulating the second time into pairing information;

sending the pairing information to a first TWS earphone, so that the first TWS earphone determines the second time when the second TWS earphone enters the working state and a first time when the first TWS earphone enters the working state according to the pairing information, and controlling the pairing between the first TWS earphone and the second TWS earphone according to the first time, the second time and a preset duration threshold;

wherein the pairing information comprises an external encrypted message and a public key, and before the operation of determining a second time when each of the second TWS earphones enters the working state according to the pairing information, the method further comprises:

decoding the external encrypted message according to the public key to obtain a globally unique identifier and an identity identifier;

determining whether the globally unique identifier matches the local globally unique identifier and whether the identity identifier matches the local identity identifier;

if yes, entering the step of determining a second time when each of the second TWS earphones enters the working state according to the pairing information; and if no, discarding the pairing information.

* * * * *